(12) United States Patent
Chen et al.

(10) Patent No.: US 7,141,635 B2
(45) Date of Patent: Nov. 28, 2006

(54) CATALYST COMPOSITION AND POLYMERIZATION PROCESS USING MIXTURES OF SELECTIVITY CONTROL AGENTS

(75) Inventors: Linfeng Chen, Sugar Land, TX (US); Thomas L. Nemzek, Katy, TX (US)

(73) Assignee: Union Carbide Chemicals and Plastics Tech, Midland, MI (US)

( * ) Notice: Subject to any disclaimer, the term of this patent is extended or adjusted under 35 U.S.C. 154(b) by 40 days.

(21) Appl. No.: 10/514,608

(22) PCT Filed: May 20, 2003

(86) PCT No.: PCT/US03/15782

§ 371 (c)(1),
(2), (4) Date: Nov. 16, 2004

(87) PCT Pub. No.: WO03/106512

PCT Pub. Date: Dec. 24, 2003

(65) Prior Publication Data

US 2006/0167194 A1  Jul. 27, 2006

Related U.S. Application Data

(60) Provisional application No. 60/388,730, filed on Jun. 14, 2002.

(51) Int. Cl.
*C08F 4/42*  (2006.01)
*C08F 210/00*  (2006.01)

(52) U.S. Cl. ............. 526/128; 526/124.1; 526/124.2; 526/124.3; 526/348; 526/351; 526/352; 526/901; 502/103; 502/125; 502/104; 502/133

(58) Field of Classification Search ............. 526/124.1, 526/124.2, 124.3, 128, 348, 351, 352, 901; 502/103, 125, 104, 133
See application file for complete search history.

(56) References Cited

U.S. PATENT DOCUMENTS

| | | | |
|---|---|---|---|
| 4,107,413 A | 8/1978 | Giannini et al. | 526/114 |
| 4,115,319 A | 9/1978 | Scatá et al. | 252/429 B |
| 4,220,554 A | 9/1980 | Scatá et al. | 252/429 B |
| 4,294,721 A | 10/1981 | Cecchin et al. | 252/429 B |
| 4,330,649 A | 5/1982 | Kioka et al. | 526/125 |
| 4,439,540 A | 3/1984 | Cecchin et al. | 502/125 |
| 4,442,276 A | 4/1984 | Kashiwa et al. | 526/125 |
| 4,460,701 A | 7/1984 | Terano et al. | 502/104 |
| 4,472,521 A | 9/1984 | Band | 502/104 |
| 4,540,679 A | 9/1985 | Arzoumanidis et al. | 502/111 |
| 4,547,476 A | 10/1985 | Terano et al. | 502/127 |
| 4,548,915 A | 10/1985 | Goodall et al. | 502/104 |
| 4,562,173 A | 12/1985 | Terano et al. | 502/127 |
| 4,728,705 A | 3/1988 | Nestlerode et al. | 526/125 |
| 4,816,433 A | 3/1989 | Terano et al. | 502/127 |
| 4,829,037 A | 5/1989 | Terano et al. | 502/112 |
| 4,927,797 A | 5/1990 | Ewen | 502/127 |
| 4,990,479 A | 2/1991 | Ishimaru et al. | 502/125 |
| 5,028,671 A | 7/1991 | Kioka et al. | 526/125 |
| 5,034,361 A | 7/1991 | Job et al. | 502/9 |
| 5,066,737 A | 11/1991 | Job | 526/119 |
| 5,066,738 A | 11/1991 | Ewen | 526/124 |
| 5,077,357 A | 12/1991 | Job | 526/119 |
| 5,082,907 A | 1/1992 | Job | 526/119 |
| 5,100,981 A | 3/1992 | Schreck et al. | 526/125 |
| 5,106,806 A | 4/1992 | Job | 502/111 |
| 5,146,028 A | 9/1992 | Job | 585/512 |
| 5,151,399 A | 9/1992 | Job | 502/127 |
| 5,153,158 A | 10/1992 | Kioka et al. | 502/126 |
| 5,192,732 A | 3/1993 | Duranel et al. | 502/126 |
| 5,229,342 A | 7/1993 | Job | 502/127 |
| 5,247,031 A | 9/1993 | Kioka et al. | 526/125 |
| 5,247,032 A | 9/1993 | Kioka et al. | 526/128 |
| 5,414,063 A | 5/1995 | Seeger et al. | 526/88 |
| 5,652,303 A | 7/1997 | Ishimaru et al. | 526/125.3 |
| 5,844,046 A | 12/1998 | Ohgizawa et al. | 525/270 |
| 5,849,654 A | 12/1998 | Fushimi et al. | 502/125 |
| 5,869,418 A | 2/1999 | Iiskola et al. | 502/125 |
| 6,066,702 A | 5/2000 | Ro et al. | 526/125.3 |
| 6,087,459 A | 7/2000 | Miro et al. | 526/128 |
| 6,096,844 A | 8/2000 | Fushimi et al. | 526/128 |
| 6,111,039 A * | 8/2000 | Miro et al. | 526/128 |
| 6,127,303 A | 10/2000 | Ebara et al. | 502/125 |
| 6,133,385 A | 10/2000 | Shamshoum et al. | 526/128 |
| 6,147,024 A | 11/2000 | Shamshoum et al. | 502/103 |
| 6,184,328 B1 | 2/2001 | Yanagihara et al. | 526/351 |
| 6,303,698 B1 | 10/2001 | Ushioda et al. | 525/322 |
| 6,337,377 B1 | 1/2002 | Ebara et al. | 526/124.6 |
| 2002/0119888 A1* | 8/2002 | Miro | 502/103 |

FOREIGN PATENT DOCUMENTS

| | | |
|---|---|---|
| WO | WO95/21203 | 8/1995 |
| WO | WO99/20663 | 4/1999 |
| WO | WO99/58585 | 11/1999 |

* cited by examiner

*Primary Examiner*—Ling-Sui Choi

(57) ABSTRACT

A catalyst composition for the polymerization of olefins and process for the use thereof, comprising the combination of one or more Ziegler-Natta catalysts, comprising one or more transition metal compounds, one or more aluminum containing cocatalyts, and a mixture of different selectivity control agents, including in said mixture of selectivity control agents at least one normally dominating selectivity control agent and one normally dominated selectivity control agent, characterized in that the individual selectivity control agents are present in the mixture in relative amounts to each other and relative to the one or more transition metal compounds, such that the effect of the selectivity control agents on the resulting polymer properties is not determined solely or substantially solely by the normally dominating selectivity control agent.

21 Claims, 1 Drawing Sheet

US 7,141,635 B2

CATALYST COMPOSITION AND POLYMERIZATION PROCESS USING MIXTURES OF SELECTIVITY CONTROL AGENTS

CROSS REFERENCE STATEMENT

This application claims the benefit of U.S. Provisional Application No. 60/388,730, filed Jun. 14, 2002.

BACKGROUND OF THE INVENTION

The present invention relates to Ziegler-Natta catalyst compositions for use in the polymerization of olefins having improved control over polymer properties through the use of carefully chosen mixtures of selectivity control agents. Ziegler-Natta catalyst compositions are well known in the art. Typically, these compositions include a transition metal polymerization catalyst, especially titanium containing compound; a co-catalyst, usually an organoaluminum compound; and a selectivity control agent (SCA), usually an organosilicon compound. Examples of such Ziegler-Natta catalyst compositions are shown in U.S. Pat. No. 4,107,413; U.S. Pat. No. 4,294,721; U.S. Pat. No. 4,439,540; U.S. Pat. No. 4,115,319; U.S. Pat. No. 4,220,554; U.S. Pat. No. 4,460,701; U.S. Pat. No. 5,247,032; U.S. Pat. No. 5,247,031; U.S. Pat. No. 5,229,342; U.S. Pat. No. 5,153,158; U.S. Pat. No. 5,151,399; U.S. Pat. No. 5,146,028; U.S. Pat. No. 5,106,806; U.S. Pat. No. 5,082,907; U.S. Pat. No. 5,077,357; U.S. Pat. No. 5,066,738; U.S. Pat. No. 5,066,737; U.S. Pat. No. 5,034,361; U.S. Pat. No. 5,028,671; U.S. Pat. No. 4,990,479; U.S. Pat. No. 4,927,797; U.S. Pat. No. 4,829,037; U.S. Pat. No. 4,816,433; U.S. Pat. No. 4,728,705; U.S. Pat. No. 4,562,173; U.S. Pat. No. 4,548,915; U.S. Pat. No. 4,547,476; U.S. Pat. No. 4,540,679; U.S. Pat. No. 4,472,521; U.S. Pat. No. 4,442,276; and U.S. Pat. No. 4,330,649.

Catalyst compositions designed primarily for the polymerization of propylene or mixtures of propylene and ethylene generally include a selectivity control agent in order to affect polymer properties, especially tacticity or stereoregularity of the polymer backbone. As one indication of the level of tacticity, especially the isotacticity of polypropylene, the quantity of such polymer that is soluble in xylene or similar liquid that is a non-solvent for the tactic polymer is often used. This is referred to as the xylene solubles content of the polymer, or XS. In addition to tacticity control, molecular weight distribution (MWD), melt flow (MF), and other properties of the resulting polymer are affected by use of a SCA as well. Because MF is also affected by use of a chain transfer agent, normally hydrogen, the $H_2$ response of the polymerization can be adjusted through the use of a SCA. Often however, a SCA which gives desirable control over one polymer property, is ineffective or detrimental with respect to additional properties of the polymer.

Use of mixtures of SCA's in order to adjust polymer properties either according to an expected average of the resulting properties or through use of multiple reactors, thereby achieving benefit of the effect of individual SCA's is known. Examples of prior art disclosures of catalyst compositions making use of mixed SCA's include: U.S. Pat. No. 5,652,303, U.S. Pat. No. 6,087,459, U.S. Pat. No. 6,147,024, U.S. Pat. No. 6,111,039, WO 95/21203 and WO 99/20663. Disadvantageously, certain highly desirable SCA's, referred to as "dominating SCA's", generally operate under polymerization conditions so as to exclude the effects of other SCA's. If a normally dominating SCA is present in a single reactor under conventional polymerization conditions, the resulting polymer properties are determined essentially solely by the dominating SCA, and little or no effect from the presence of the additional SCA's is observed. Other SCA's, referred to as "competing" or "cooperative" SCA's, operate in mixtures according to an expected mutuality wherein both compounds affect the polymer properties. Just as the relative rate constants of different compounds determines their relative productivities under use conditions, various polymer properties are affected to a greater or lesser degree by different SCA's. With respect to a given polymer property or functionality, the corresponding ability of a given SCA to affect that property operating as the sole SCA or as a mixture of one or more SCA's can be measured. Based on such measurements, the relative functionality control capability of individual compounds and the relative dominating ability of SCA's when employed as a mixture can be determined.

Previously, the use of mixtures of SCA's in a single reaction step and reactor has been confined to the use of cooperative mixtures for the foregoing reason. Examples of such cooperative mixtures of SCA's include the combination of DCPDMS and propyltriethoxysilane (PTES) or methylcyclohexyldimethoxysilane (MCHDMS). Other examples are disclosed in U.S. Pat. No. 6,337,377, U.S. Pat. No. 6,303,698, U.S. Pat. No. 6,184,328, U.S. Pat. No. 6,133,385, U.S. Pat. No. 6,127,303, U.S. Pat. No. 6,096,844, U.S. Pat. No. 6,087,459, U.S. Pat. No. 6,066,702, U.S. Pat. No. 5,869,418, U.S. Pat. No. 5,849,654, U.S. Pat. No. 5,844,046, U.S. Pat. No. 5,652,303, U.S. Pat. No. 5,414,063, U.S. Pat. No. 5,192,732, U.S. Pat. No. 5,100,981, and WO 99/58585.

WO 95/21203 recognized dominating behavior for SCA's, when used together in a single reaction step, at molar ratios of SCA: transition metal of 33:1. Mixtures of dicyclopentadienyldimethoxysilane (DCPDMS) and tetraethoxysilane (TEOS) were used as the SCA pair of interest. U.S. Pat. No. 6,111,039 and WO 99/20663 disclosed the use of a multistage process for preparing α-olefin homopolymers and copolymers, especially polypropylene and ethylene/propylene copolymers, using mixtures of SCA's wherein one SCA is dominating. The dominating effect of one SCA over the other was avoided by adding the dominating SCA to only the second of a series of reactors.

There remains a need in the art to provide a Ziegler-Natta catalyst composition for the polymerization of olefins comprising the combination of a Ziegler-Natta catalyst with a mixture of selectivity control agents including in said mixture, a dominating selectivity control agent, characterized in that the activity of a dominating selectivity control agent is moderated, and the properties of the resulting polymer are influenced by all of the SCA's in the mixture.

SUMMARY OF THE INVENTION

The present invention provides a catalyst composition for the polymerization of olefins comprising the combination of one or more Ziegler-Natta catalysts comprising one or more transition metal compounds; one or more aluminum containing cocatalyts; and a mixture of two or more different selectivity control agents (SCA's), including in said mixture of selectivity control agents at least one normally dominating selectivity control agent (SCA1) and at least one normally dominated selectivity control agent (SCA2), characterized in that the individual selectivity control agents are present in the mixture in relative amounts with respect to each other and with respect to the one or more transition metal compounds, such that the effect of the selectivity control agents on the resulting polymer properties is not determined solely or substantially solely by the normally dominating selectivity control agent.

The present invention also provides a method of polymerizing one or more olefins and, optionally, one or more polymerizable comonomers, especially propylene, a mixture of ethylene and propylene, or a mixture of propylene, ethylene and a conjugated or non-conjugated diene under polymerization conditions using the previously described Ziegler-Natta catalyst composition comprising said mixture of dominating and dominated SCA's. The polymerization may be conducted in a single reactor or in two or more reactors connected in series. Beneficially, when operating in multiple reactors there is no need for separate addition of selectivity control agents in order to avoid the dominating control of what would otherwise be the dominating selectivity control agent.

Although a broad range of compounds are known generally as selectivity control agents, a particular catalyst composition may have a specific compound or group of compounds with which it is especially compatible. The present invention provides a catalyst composition for the polymerization of olefins which includes the combination of a particular type of catalyst with a mixture of two of more selectivity control agents which results in the ability to control the polymer properties, especially stereoselectivity measured, for example, by xylene extractable (XS) content, stereoregularity, molecular weight (MW), molecular weight distribution (MWD), melting point (MP), tensile yield (TY), or melt flow rate (MF), especially melt flow rate, despite the presence of a normally dominating selectivity control agent in the mixture of selectivity control agents.

DETAILED DESCRIPTION

Figure 1:
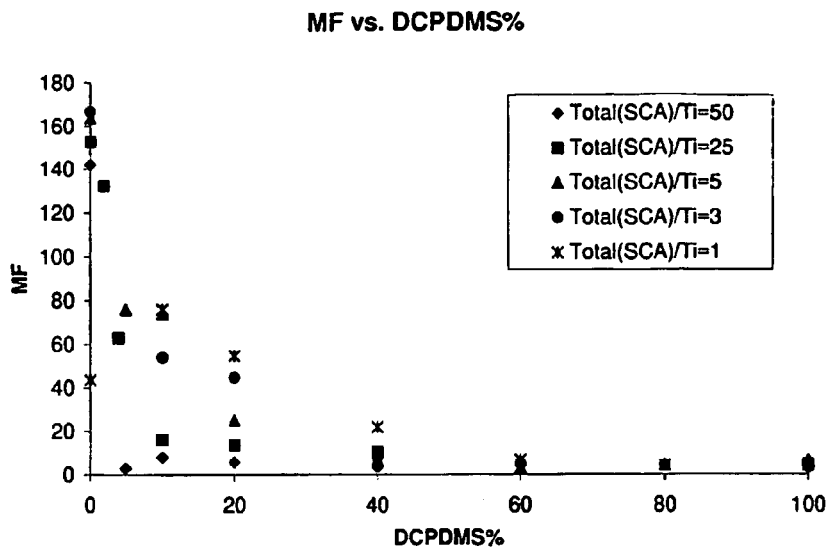
FIG. 1 is a plot of the melt flow of polymers as a function of percent dominating SCA prepared according to Examples 1–18 and corresponding comparatives.

All reference to the Periodic Table of the Elements herein shall refer to the Periodic Table of the Elements, published and copyrighted by CRC Press, Inc., 1999. Also, any reference to a Group or Groups shall be to the Group or Groups as reflected in this Periodic Table of the Elements using the IUPAC system for numbering groups. For purposes of United States patent practice, the contents of any patent, patent application or publication referenced herein are hereby incorporated by reference in their entirety herein, especially with respect to the disclosure of structures, synthetic techniques and general knowledge in the art. The term "comprising" when used herein with respect to a composition or mixture is not intended to exclude the additional presence of any other compound or component.

The term "mixture" when used with respect to SCA's, means the use of two or more SCA components simultaneously in a polymerization process. The individual SCA's may be added separately to the reactor or premixed, and desirably are used in the form of dilute hydrocarbon solutions thereof. In addition, other components of the polymerization mixture, including the procatalyst, may be combined with one or more of the SCA's of the mixture, and optionally prepolymerized, prior to addition to the reactor. The term "normally dominating" refers to a SCA that, but for operation according to the process conditions of the present invention, would solely or substantially solely determine one or more of the physical properties, selected from MF, MW, MWD, XS, Ec, and stereoregularity, of a resulting polymer under the polymerization conditions of interest. More particularly, a normally dominating SCA solely or substantially solely determines one or more of a polymer's physical properties, selected from MF, MW, MWD, Ec, and stereoregularity, especially MF, when used in a polymerization process wherein the molar ratio of SCA employed based on transition metal, is greater than 25:1 or the quantity of normally dominating SCA in the mixture of SCA's is greater than 60 mol percent.

(1) A selectivity control agent mixture for optimization of polymer properties (melt flow, molecular weight, molecular weight distribution, melting point, tensile yield, or stereoselectivity as determined by xylene soluble content (XS), especially MF, herein comprises at least two SCA's, defined as SCA1 and SCA2, characterized in that f(SCA1)/f(SCA2)≠1, wherein f(SCA1) and f(SCA2) are respective functional properties (MF, MW, MWD, XS, MP, Ec, stereoregularity, TY, or other polymer property affected by use of an SCA, especially MF) of polymers formed by polymerizing at least one α-olefin monomer with a Ziegler-Natta catalyst composition comprising either SCA1 or SCA2 respectively, under what are otherwise the same polymerization conditions including the same total quantity of SCA (here-in-after referred to as "standard polymerization conditions"), and SCA1 is a dominating SCA and SCA2 is a dominated SCA, such that, f(0.5SCA1+0.5SCA2) is approximately equal to f(SCA1), and preferably:

2≧f(0.5SCA1+0.5SCA2)/f(SCA1)≧0.5;

when ((SCA1)+(SCA2))/(Tr)>25 where f(0.5SCA1+0.5SCA2) is the same property of a polymer that is formed under what are otherwise standard polymerization conditions including the same total quantity of SCA, excepting that a 50/50 mole ratio of SCA1 and SCA2 is employed, and (SCA1), (SCA2) and (Tr) are the respective molar amounts of SCA1, SCA2 and transition metal compound present in the reactor.

The benefits of the invention are obtained by operation in a range of limited availability of total SCA and dominating SCA, defined by:

0<((SCA1)+(SCA2))/(Tr)≦25, preferably

1<((SCA1)+(SCA2))/(Tr)≦15; more preferably

2<((SCA1)+(SCA2))/(Tr)≦12; and (SCA1)/((SCA1)+(SCA2))≦0.6, preferably ≦0.5.

According to the invention, by adjusting the ratios of (SCA1)/(SCA2) and ((SCA1)+(SCA2))/(Tr) according to the foregoing limitations, the melt flow, molecular weight distribution, solubles content, or other properties of the resulting polymer, especially MF, is a function of both SCA1 and SCA2 such that f(SCA1+SCA2) is substantially different from f(SCA1), preferably f((SCA1)+(SCA2)) differs from f(SCA1) by at least 10 percent, more preferably at least 25 percent, and most preferably:

1000≧f((SCA1)+(SCA2))/f(SCA1)≧2, if f((SCA1)+(SCA2))>f(SCA1), or 0.001≦f((SCA1)+(SCA2))/f(SCA1)≦0.5, if f((SCA1)+(SCA2))<f(SCA1), where, f(SCA1+SCA2) is the measured functional property (MF, MW, MWD, XS, Ec, stereoregularity, or other property, especially MF) of polymers formed under what are otherwise standard polymerization conditions excepting that an SCA mixture containing both SCA1 and SCA2 is employed.

The foregoing benefits of the invention are illustrated with respect to MF properties for the case where SCA1 by itself gives low MF polymer and SCA2 by itself gives high MF polymer (f(SCA1)<f(SCA2)), by the following specific illustration.

A selectivity control agent mixture for optimization of melt flow properties (MF) herein comprises at least two SCA's, defined as SCA1 and SCA2, characterized in that
MF(SCA1)/MF(SCA2)<1, wherein
MF(SCA1) and MF(SCA2) are melt flows of polymers formed by polymerizing at least one olefin monomer with a Ziegler-Natta catalyst composition comprising either SCA1 or SCA2 respectively, under what are otherwise the same polymerization conditions, including the same total quantity of SCA (here-in-after referred to as "standard MF polymerization conditions"), and
SCA1 is a dominating SCA and SCA2 is a dominated SCA, satisfying the formula:
2≧MF(0.5SCA1+0.5SCA2)/MF(SCA1)≧0.5;
when
((SCA1)+(SCA2))/(Tr)>25
where MF(0.5SCA1+0.5SCA2) is the MF of a polymer that is formed under what are otherwise standard MF polymerization conditions, including identical total quantity of SCA, excepting that a 50/50 mole ratio of SCA1 and SCA2 is employed, and (SCA1), (SCA2) and (Tr) are the respective molar amounts of SCA1, SCA2 and transition metal compound actively participating in the polymerization process.

The benefits of the invention are obtained by operation in a range of limited availability of total SCA and dominating SCA, defined by:
0<((SCA1)+(SCA2))/(Tr)≦25, preferably
1<((SCA1)+(SCA2))/(Tr)≦15; more preferably
2<((SCA1)+(SCA2))/(Tr)≦12; and
(SCA1)/((SCA1)+(SCA2))≦0.6, preferably ≦0.5.

According to the invention, by adjusting the ratios of (SCA1)/(SCA2) and ((SCA1)+(SCA2))/(Tr), the melt flow of the resulting polymer is a function of both SCA1 and SCA2 which satisfies the relationship:
1000>MF(SCA1+SCA2)/MF(SCA1)>2, where, MF(SCA1+SCA2) is the melt flow of a polymer that is formed under what are otherwise standard MF polymerization conditions excepting that an SCA mixture containing both SCA1 and SCA2 is employed.

The benefits of the invention are also applicable to mixtures of more than two SCA's, provided that one SCA in the mixture acts as a dominating SCA with respect to all remaining members of the mixture, as determined by the foregoing relationships, and the quantity of total SCA employed is limited to provide a molar ratio, based on transition metal (that is, ((SCA1)+(SCA2)+ . . . (SCAn))/(Tr)) of 25:1 or less, preferably from 0.1 to 25, more preferably from 0.5 to 15, and most preferably from 1 to 12. The quantity of dominating SCA (SCA1) in the mixture of SCA's is preferably from 0.1 to 60 mol percent, more preferably from 0.5 to 50 mol percent, most preferably from 1 to 40 mol percent of the total SCA mixture.

Suitable SCA's for use herein include silicon compounds, especially alkoxy silanes; ethers and polyethers, especially alkyl-, cycloalkyl-, aryl-, mixed alkyl/aryl-, mixed alkyl/cycloalkyl-, and/or mixed cycloalkyl/aryl-ethers and/or polyethers; esters and polyesters, especially alkyl-, cycloalkyl- and/or aryl-esters of monocarboxylic or dicarboxylic acids, preferably aromatic monocarboxylic- or dicarboxylic acids; alkyl- or cycloalkyl-ether or thioether derivatives of such esters or polyesters, especially alkyl ether derivatives of alkyl esters or diesters of aromatic monocarboxylic or dicarboxylic acids; and Group 15 or 16 heteroatom-substituted derivatives of all of the foregoing; and amine compounds, especially cyclic, aliphatic or aromatic amines, more especially pyrrol or pyridine compounds; all of the foregoing SCA's containing from 2 to 60 carbons total and from 1 to 20 carbons in any alkyl or alkylene group, 3 to 20 carbons in any cycloalkyl or cycloalkylene group, and 6 to 20 carbons in any aryl or arylene group.

Preferred SCA's for use herein are alkoxy silanes having the general formula: $SiR_m(OR')_{4-m}$ (I) where R independently each occurrence is a hydrogen or a hydrocarbyl group of up to 20 carbons optionally substituted with one or more Group 15 or 16 heteroatoms; R' is a $C_{1-20}$ alkyl group; and m is 0–3. Preferably, one selectivity control agent is of the formula (I) where R is $C_{6-12}$ aryl or $C_{5-12}$ cycloalkyl, R' is $C_{1-4}$ alkyl, and m is 2 and at least one other selectivity control agent is present in the mixture wherein R' is $C_{1-4}$ alkyl and m is 0. Most preferably the present invention employs two selectivity control agents. Generally, SCA's of the foregoing formula wherein m is 1 or 2 are dominating SCA's when employed with SCA's of the foregoing formula wherein m is 0. Two or more of such SCA's wherein m is 1 or 2 may act as competing or dominating mixtures of SCA's.

Examples of selectivity control agents for use herein include compounds that are normally dominating and compounds that are normally dominated. Examples of the former include: dicyclopentyldimethoxysilane, di-tert-butyldimethoxysilane, methylcyclohexyldi-methoxysilane, diphenydimethoxysilane, diisopropyldimethoxysilane, di-n-propyldimethoxy-silane, di-n-butyldimethoxysilane, cyclopentyltrimethoxysilane, n-propyltrimethoxysilane, n-propyltriethoxysilane, ethyltriethoxysilane, cyclopentylpyrrolidinodimethoxysilane, bis(pyrrolidino)dimethoxysilane, and bis(perhydroisoquinolino)dimethoxysilane.

Examples of normally dominated SCA's include: tetraethoxysilane, tetrapropoxysilane, tetrabutoxysilane, 1,2-di-n-propoxybenzene, 1,2-di-n-butoxybenzene, 1-ethoxy-2-n-pentoxybenzene, 2,6-lutidine, tetrahydrofuran, ethyl p-ethoxybenzoate, diisobutyl phthalate.

By the terms "normally dominating" is meant that single compounds from the normally dominating grouping dominate in control of one of more of the properties of the resulting polymer, especially MF, when used as one component of an SCA mixture in combination with one or more compounds from the "normally dominated" grouping. Conversely, all of the compounds of the "normally dominated" grouping are dominated by any one or more of the compounds from the "normally dominating" grouping. Most preferably, the present invention employs two SCA's, most preferably a mixture of dicyclopentadienyldimethoxysilane (DCPDMS) and tetraethoxysilane (TEOS).

Ziegler-Natta polymerization catalysts for use in the present invention comprise a solid complex derived from a transition metal compound, for example, titanium-, zirconium-, chromium- or vanadium-hydrocarbyloxides, hydrocarbyls, halides, or mixtures thereof; and a Group 2 metal compound, especially a magnesium halide. Preferred polymerization catalysts comprise a mixture of titanium halides supported on magnesium halide compounds.

Any of the conventional Ziegler-Natta, transition metal compound containing catalysts can be used in the present invention. The catalyst component of a conventional Ziegler-Natta catalyst preferably contains a transition metal compound of the general formula $TrX_x$ where Tr is the transition metal, X is a halogen or a $C_{1-10}$ hydrocarboxyl or hydrocarbyl group, and x is the number of such X groups in the compound in combination with a magnesium halide. Preferably, Tr is a Group 4, 5 or 6 metal, more preferably a Group 4 metal, and most preferably titanium. Preferably, X is chloride, bromide, $C_{1-4}$ alkoxide or phenoxide, or a mixture thereof, more preferably chloride.

Illustrative examples of suitable transition metal compounds that may be used to form a Ziegler-Natta transition metal catalyst are $TiCl_4$, $ZrCl_4$, $TiBr_4$, $Ti(OC_2H_5)_3Cl$, $Zr(OC_2H_5)_3Cl$, $Ti(OC_2H_5)_3Br$, $Ti(OC_3H_7)_2Cl_2$, $Ti(OC_6H_5)_2Cl_2$, $Zr(OC_2H_5)_2Cl_2$, and $Ti(OC_2H_5)Cl_3$. Mixtures of such transition metal compounds may be used as well. No restriction on the number of transition metal compounds is made as long as at least one transition metal compound is present. A preferred transition metal compound is a titanium compound.

Examples of suitable Group 2 metal compounds include magnesium halides, dialkoxymagnesiums, alkoxymagnesium halides, magnesium oxyhalides, dialkylmagnesiums, magnesium oxide, magnesium hydroxide, and carboxylates of magnesium.

Suitable Ziegler-Natta, transition metal catalysts that may be used in the present invention are disclosed in U.S. Pat. No. 4,927,797; U.S. Pat. No. 4,816,433 and U.S. Pat. No. 4,839,321. In these patents the Ziegler-Natta transition catalyst compound is described as comprising a solid catalyst component obtained by (i) suspending a dialkoxy magnesium in an aromatic hydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii).

Internal electron donors are generally present in the catalyst composition to provide tacticity control and catalyst crystallite sizing. Examples of suitable internal electron donors include: amines, amides, ethers, esters, aromatic esters, ketones, nitriles, phosphines, stibines, arsines, phosphoramides, thioethers, thioesters, aldehydes, alcoholates, and salts of organic acids. Preferred internal electron donor compounds are aromatic dicarboxylic acid diesters, especially phthalate esters, or alkyl ether derivatives of aromatic carboxylic acid esters, especially alkyl ethers of benzoic acid esters.

The Ziegler-Natta, transition metal catalyst may also include an inert support material, if desired. The support should be an inert solid which does not adversely alter the catalytic performance of the transition metal compound. Examples include metal oxides, such as alumina, and metalloid oxides, such as silica.

Co-catalysts for use with the foregoing Ziegler-Natta catalysts according to the invention include organoaluminum compounds, such as alkylaluminumdihalides, trialkoxyaluminums, dialkylaluminum halides, and trialkylaluminum compounds containing from 1–10 carbon atoms in each alkyl group. Preferred cocatalytsts are $C_{1-4}$ trialkylaluminum compounds, especially triethylaluminum (TEA).

One suitable method of practicing a polymerization process according to the present invention comprises performing the following steps in any order or in any combination, or subcombination of individual steps:

a) providing a Ziegler-Natta catalyst composition to a polymerization reactor;

b) providing an organoaluminum cocatalyst compound to the polymerization reactor;

c) providing a mixture of SCA's meeting the foregoing requirements to the polymerization reactor;

d) providing one or more polymerizable monomers to the reactor; and e) extracting polymer product from the reactor.

The catalyst composition of the invention may be used in most all commercially known polymerization processes. A preferred process includes a pre-polymerization of the catalyst by contacting a small amount of monomer with the catalyst after the catalyst has been contacted with the co-catalyst and the selectivity control agent mixture. One such suitable pre-polymerization process is described in U.S. Pat. No. 4,767,735, and U.S. Pat. No. 4,927,797. In a manner analogous to the disclosure provided in those disclosures, a carrier stream for the catalyst composition is provided, the catalyst composition is contacted with the co-catalyst compound, then further contacted with the selectivity control agent mixture. Then, the resulting activated catalyst stream is contacted with a relatively small amount of the total amount of monomer to be polymerized, the catalyst stream then passes through a prepolymerization reactor, and the resulting stream containing pre-polymerized catalyst is introduced into the polymerization reaction zone.

For example, according to one suitable prepolymerization process a portion of the olefin monomer is precontacted with the catalyst composition and optionally some or all of the SCA mixture or individual components of the SCA mixture and prepolymerized under prepolymerization conditions and subsequently the resulting prepolymerization product is further contacted with an additional quantity or all of the remaining olefin or olefin mixture and SCA mixture and further polymerized.

Preferred polymerization processes in which the present invention is particularly suited include gas phase, liquid phase, slurry, and bulk polymerization processes, operating in one or more than one reactor. Suitable gas phase polymerization processes include the use of condensing mode as well as super condensing mode wherein gaseous components including added inert low boiling compounds are injected into the reactor in liquid form for purposes of heat removal. When multiple reactors are employed it is desirable that they operate in series, that is the effluent from the first reactor is charged to the second reactor and additional monomer or different monomer added to continue polymerization. Additional catalyst or catalyst components (that is procatalyst or cocatalyst) may be added, as well as additional quantities of the SCA mixture, another SCA mixture, or individual SCA's. Highly desirably, the mixture of SCA's is added to only the first reactor of the series.

More preferably, the process of the invention is conducted in two reactors in which two olefins, most preferably, propylene and ethylene, are contacted to prepare a copolymer. In one such process, polypropylene is prepared in the first reactor and a copolymer of ethylene and propylene is prepared in the second reactor in the presence of the polypropylene prepared in the first reactor. Regardless of the polymerization technique employed, it is understood that the mixture of SCA's and the catalyst composition to be employed, or at least the procatalyst component thereof may be contacted in the absence of other polymerization components, especially, monomer prior to addition to the reactor.

The invention is further illustrated by the following Examples that should not be regarded as limiting of the present invention. Unless stated to the contrary or conventional in the art, all parts and percents are based on weight.

EXAMPLES 1–18

A titanium containing Ziegler-Natta catalyst composition was employed to produce polypropylene homopolymers. The catalyst composition included a procatalyst compound prepared by slurrying a mixture of a magnesium diethoxide and titanium ethoxide/chloride containing precursor corresponding to the formula $Mg_3Ti(OC_2H_5)_8Cl_2$ (made substantially according to U.S. Pat. No. 5,077,357) with diisobutylphthalate (0.2 liter/kilogram precursor) in a 50/50 (vol/vol) mixture of $TiCl_4$/monochlorobenzene (MCB, 19 liters/kilogram precursor). After the mixture was heated at 113° C. for 60 minutes, it was filtered. The resulting moist mass was slurried in a 50/50 $TiCl_4$/MCB mixture (19 liters/kilogram precursor) at 113° C. for 30 minutes, filtered, and the process repeated once more. The resulting solid was rinsed with isopentane and then dried with flowing warm nitrogen. This procatalyst contains 2.76 percent Ti and is designated as procatalyst A.

A portion of procatalyst A was heated once again in an MCB slurry at 130° C. for 30 minutes, filtered, and dried. The resulting procatalyst was again analyzed and found to contain 1.5 percent Ti. This procatalyst is designated as procatalyst B.

Propylene was polymerized in a laboratory scale liquid phase autoclave batch reactor operating under slurry polymerization conditions using a mixture of dicyclopentyldimethoxysilane (DCPDMS) and tetraethoxysilane (TEOS) selectivity control agents. Unless indicated otherwise, the polymerizations were conducted at 67° C., for one hour, using 17.0 mg of procatalyst B, triethylaluminum cocatalyst in an amount to provide Al:SCA ratio of 4, and 400 psi (2.8 MPa) of hydrogen and 3.8 liter of liquid propylene. Polymer properties at various total SCA values ($\Sigma$(SCA)) are provided in Tables 1–5.

DCPDMS when employed under conventional polymerization conditions is a dominating SCA with respect to TEOS. Polymer properties, especially melt flow (determined according to ASTM D1238 condition L) and xylene extractable content (determined by the $^1$H NMR method as described in U.S. Pat. No. 5,539,309, or the gravimetric XS method of ASTM D5492) would be expected according to prior art teachings to be influenced almost entirely by the quantity of DCPDMS utilized, and not the sum of DCPDMS and TEOS. Results at four molar ratios of total SCA:Ti of 1, 3, 5 and 25, respectively, (showing comparative results where DCPDMS=0, and >60 mole percent of total SCA) and comparative (total SCA:Ti=50) are found in Tables 1–5 and are depicted in graphical form in FIG. 1.

TABLE 1

Polymerization Results DCPDMS/TEOS ($\Sigma$(SCA)/Ti = 1)

| Ex. | DCPDMS (percent) | TEOS (percent) | PP (kg/g cat.) | MF (g/10 min) | XS (percent) |
|---|---|---|---|---|---|
| 1A* | 0 | 100 | 14.6 | 43.5 | 9.2 |
| 1 | 10 | 90 | 19.4 | 75.9 | 8.9 |
| 2 | 20 | 80 | 23.1 | 54.7 | 8.2 |
| 3 | 40 | 60 | 23.8 | 21.9 | 7.1 |

TABLE 1-continued

Polymerization Results DCPDMS/TEOS ($\Sigma$(SCA)/Ti = 1)

| Ex. | DCPDMS (percent) | TEOS (percent) | PP (kg/g cat.) | MF (g/10 min) | XS (percent) |
|---|---|---|---|---|---|
| 4 | 60 | 40 | 25.9 | 6.6 | 4.6 |
| 1B* | 80 | 20 | 26.8 | 4.1 | 3.5 |
| 1C* | 100 | 0 | 25.3 | 4.2 | 2.0 |

*comparative, not an example of the invention

TABLE 2

Polymerization Results DCPDMS/TEOS ($\Sigma$(SCA)/Ti = 3)

| Ex. | DCPDMS (percent) | TEOS (percent) | PP (kg/g cat.) | MF (g/10 min) | XS (percent) |
|---|---|---|---|---|---|
| 2A* | 0 | 100 | 19.6 | 167 | 6.3 |
| 5 | 10 | 90 | 19.8 | 53.9 | 3.6 |
| 6 | 20 | 80 | 20.2 | 44.6 | 3.1 |
| 7 | 40 | 60 | 23.1 | 8.2 | 1.8 |
| 8 | 60 | 40 | 21.5 | 4.9 | 1.3 |
| 2B* | 80 | 20 | 20.5 | 4.2 | 1.9 |
| 2C* | 100 | 0 | 25.4 | 4.0 | 1.0 |

*comparative, not an example of the invention

TABLE 3

Polymerization Results DCPDMS/TEOS ($\Sigma$(SCA)/Ti = 5)

| Ex. | DCPDMS (percent) | TEOS (percent) | PP (kg/g cat.) | MF (g/10 min) | XS (percent) |
|---|---|---|---|---|---|
| 3A* | 0 | 100 | 21.2 | 164 | 3.8 |
| 9 | 5 | 95 | 27.8 | 75.9 | 3.0 |
| 10 | 10 | 90 | 16.6 | 73.8 | 3.3 |
| 11 | 20 | 80 | 21.7 | 25.1 | 1.9 |
| 12 | 40 | 60 | 21.8 | 6.7 | 1.6 |
| 13 | 60 | 40 | 27.6 | 3.1 | 1.3 |
| 3B* | 80 | 20 | 16.9 | 4.5 | 1.0 |
| 3C* | 100 | 0 | 21.0 | 6.4 | 1.2 |

*comparative, not an example of the invention

TABLE 4

Polymerization Results DCPDMS/TEOS ($\Sigma$(SCA)/Ti = 25)

| Ex. | DCPDMS (percent) | TEOS (percent) | PP (kg/g cat.) | MF (g/10 min) | XS (percent) |
|---|---|---|---|---|---|
| 4A* | 0 | 100 | 17.2 | 153 | 2.6 |
| 14 | 2 | 98 | 21.5 | 132 | 2.8 |
| 15 | 4 | 96 | 21.9 | 62.9 | 2.7 |
| 16 | 10 | 90 | 21.2 | 15.9 | 2.3 |
| 17 | 20 | 80 | 23.5 | 13.7 | 1.6 |
| 18 | 40 | 60 | 27.6 | 10.5 | 1.3 |
| 4B* | 100 | 0 | 17.4 | 4.5 | 0.8 |

*comparative, not an example of the invention

TABLE 5

Comparative Polymerization Results DCPDMS/TEOS ($\Sigma$(SCA)/Ti = 50)

| Ex. | DCPDMS (percent) | TEOS (percent) | PP (kg/g cat.) | MF (g/10 min) | XS (percent) |
|---|---|---|---|---|---|
| 5A* | 0 | 100 | 8.4 | 142 | 2.6 |
| 5B* | 5 | 95 | 14.2 | 2.9 | 1.1 |
| 5C* | 10 | 90 | 14.8 | 7.9 | 1.5 |

TABLE 5-continued

Comparative Polymerization Results DCPDMS/TEOS
(Σ(SCA)/Ti = 50)

| Ex. | DCPDMS (percent) | TEOS (percent) | PP (kg/g cat.) | MF (g/10 min) | XS (percent) |
|---|---|---|---|---|---|
| 5D* | 20 | 80 | 15.8 | 5.8 | 1.2 |
| 5E* | 40 | 60 | 14.6 | 3.4 | 1.1 |
| 5F* | 100 | 0 | 20.6 | 2.8 | 0.8 |

*comparative, not an example of the invention

As may be seen by reference to Tables 14 and comparative 5, at molar ratios of total SCA:Ti equal to 1:1; 3:1, 5:1 and 25:1, the normally dominating SCA (DCPDMS) can be employed in a mixture with another SCA, TEOS, which is normally dominated, in amounts up to 60 mol percent of the SCA mixture, preferably up to 50 mol percent of the SCA mixture and still permit the dominated SCA to participate in the reaction. Specifically, at amounts of DCPDMS in the mixture from 0.1 to 60 mol percent, the foregoing results are observed.

Specifically, melt flow of the resulting polymer is affected by both SCA's when the total quantity of dominating SCA is limited to no more than 60 mol percent of the mixture, preferably no more than 50 mol percent of the mixture. In addition, the molar ratio of SCA:transition metal in the active polymerization mixture, does not exceed 25:1. Preferably, this ratio is from 0.5:1 to 15:1, most preferably from 1:1 to 12:1.

EXAMPLES 19–21

Gas phase Homopolymer Production

Propylene homopolymer was made in a continuous, gas-phase, 14 inch (35.6 cm) fluidized bed reactor using Procatalyst B and differing ratios of two selectivity control agents one of which is normally dominating of the other (DCPDMS and TEOS) in varying ratios and a total SCA/Ti molar ratio of 5:1.

The reactor was equipped with a distributor plate under which the fluidization gas was introduced. The gas exited the top of the fluidized bed and was conveyed through piping to a compressor and a cooler, which was used to control the temperature of the cycle gas, thereby controlling the temperature in the fluidized bed. After cooling, the cycle gas was then reintroduced below the distributor plate. Monomer and hydrogen were fed separately to the cycle pipe.

The fluidized-bed reactor was operated with a propylene partial pressure of 320 psi (2.07 MPa) at 65° C. The catalyst slurry was metered with a syringe pump into a stream of propylene, which conveyed the catalyst to the reactor. Solutions of TEA, DCPDMS and TEOS were introduced separately into the reactor at locations on the cycle pipe.

Hydrogen level of the reactor was adjusted to provide a product having a melt flow of approximately 6. The quantity of hydrogen employed to prepare approximately equivalent polymer (based on melt flow) was found to be intermediate between levels employed for DCPDMS or TEOS alone, thereby indicating that both SCA's were contributing to polymer properties. Other measured polymer properties indicated both SCA's were responsible for modification of polymer properties as well.

The following physical properties were measured:

Polydispersity index (PDI): obtained from melt rheological testing done at 180° C. in a cone and plate fixture in a melt rheometer. PDI is calculated from the inverse of the G'G" crossover modulus, in the manner described by Zeichner and Patel, Proceedings of the 2nd World Congress of Chemical Engineering, Oct. 4–9, 1981, Montreal, Canada, p 333–337.

$\eta(0.1)/\eta(1.0)$: obtained from melt rheological testing, this number is the slope of the viscosity versus frequency curve, calculated by dividing the melt viscosity at 0.1 rad/sec by the melt viscosity at 1.0 rad/sec, where melt viscosities are obtained by melt rheological testing done at 180° C. in a cone and plate fixture in a melt rheometer.

Oligomers C-21: The amount of 21 carbon oligomers, measured by extracting a polymer sample overnight in a chloroform solution containing n-hexadecane as an internal standard. An aliquot of the extract is shaken with methanol and then filtered to remove any precipitated high molecular weight polypropylene and solid particles. The filtered liquid is then injected onto a fused silica capillary chromatography column using cold on-column injection. Relative amounts of the extracted components are calculated based on the weight of polymer extracted.

Results are contained in Table 6.

TABLE 6

| Ex. | DCPDMS/ TEOS | $H_2/C_3$ | MF dg/min. | XS (percent) | PDI[1] | $\eta(0.1)/\eta(1.0)$[2] | Oligomers C-21 (ppm)[3] | $Tm^4$ (° C.) |
|---|---|---|---|---|---|---|---|---|
| 6A* | 100/0 | 0.0216 | 5.7 | 1.7 | 4.61 | 1.50 | 255 | 163.0 |
| 6B* | " | 0.0209 | 5.8 | 1.4 | 4.64 | 1.48 | — | 163.4 |
| 19 | 40/60 | 0.0069 | 7.1 | 2.0 | 5.29 | 1.61 | 139 | 161.7 |
| 20 | 20/80 | 0.0027 | 5.6 | 1.9 | 5.19 | 1.67 | 135 | 162.0 |
| 21 | 10/90 | 0.0021 | 7.1 | 2.0 | 4.96 | 1.64 | 108 | 161.0 |
| 6C* | 0/100 | 0.0011 | 6.7 | 2.8 | 4.50 | 1.61 | 72 | 159.3 |
| 6D* | " | 0 | 5.8 | 2.7 | 4.52 | 1.64 | — | 159.0 |

| Ex. | $\Delta H^5$ (J/g) | Flex Modulus[6] kpsi (GPa) | HDT[7] (° C.) | Tensile Yield[8] psi (MPa) | Elongation at Yield[9] (percent) | Elongation at Break[9] (percent) |
|---|---|---|---|---|---|---|
| 6A* | 105.8 | 277 (1910) | 120 | 5750 (39.6) | 5.9 | 33 |
| 6B* | 106.0 | 274 (1890) | 118 | 5750 (39.6) | 6.2 | 25 |
| 19 | 105.5 | 254 (1750) | 109 | 5560 (38.3) | 6.8 | 55 |
| 20 | 104.5 | 256 (1770) | 111 | 5550 (38.3) | 6.7 | 83 |

TABLE 6-continued

| | | | | | | |
|---|---|---|---|---|---|---|
| 21 | 103.4 | 242 (1670) | 109 | 5410 (37.3) | 7.1 | >100 |
| 6C* | 99.4 | 228 (1570) | 106 | 5290 (36.5) | 7.7 | >100 |
| 6D* | 98.9 | 231 (1590) | 104 | 5310 (36.6) | 7.8 | >100 |

*comparative, not an example of the invention
[1]polydispersity index
[2]melt viscosity ratio
[3]21 carbon oligomer content
[4]second scan melting peak by differential scanning calorimetry, ASTM D 3417
[5]enthalpy in second melting scan by differential scanning calorimetry, ASTM D 3417
[6]Flexural modulus ASTM D 790
[7]Heat distortion temperature at 66 psi (455 kPa) ASTM D 648
[8]Tensile yield strength, ASTM D 638C
[9]Elongation properties are determined according to ASTM D 638C

EXAMPLE 22

Gas Phase Impact Copolymer Production

Figure 2:
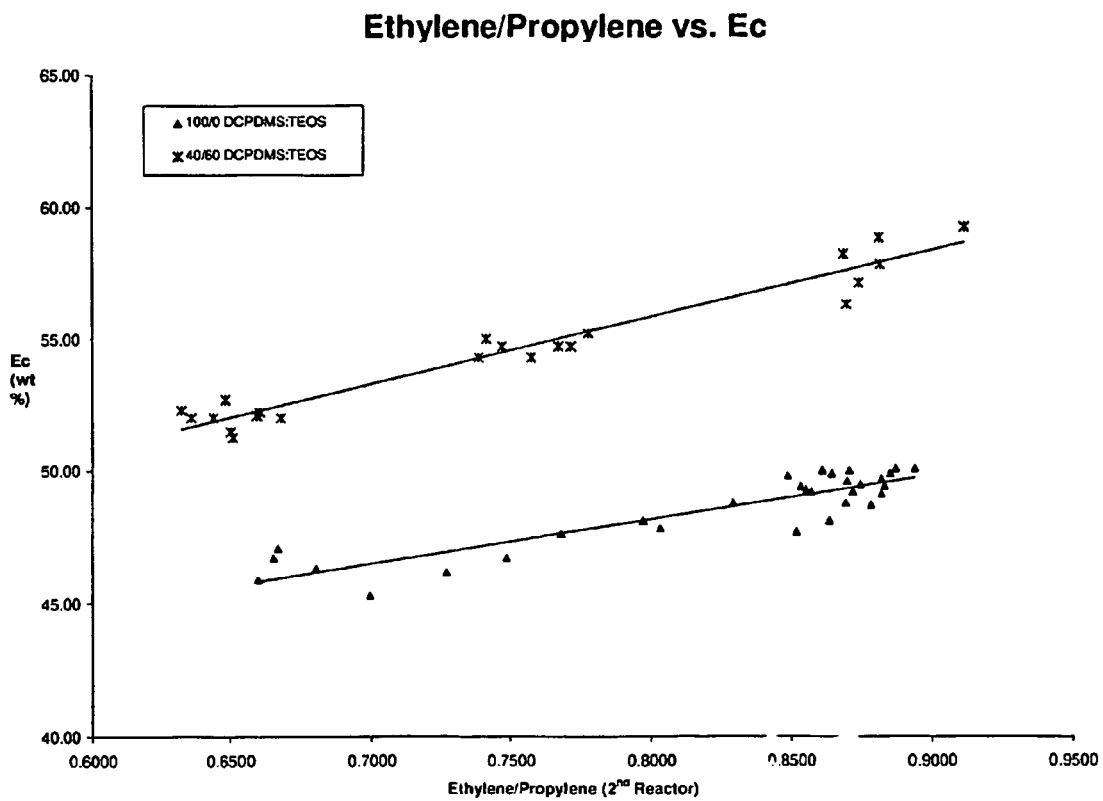
FIG. 2 is a plot of Ec (ethylene content in the rubber portion of an interpolymer comprising ethylene and propylene) as a function of ratio of ethylene and propylene in the second reactor of Example 22.

Impact copolymers were prepared by subjecting a propylene homopolymer of approximately 15 MF made according to the process of Examples 19–21 to continued polymerization by transfer in a semi-continuous manner to a second, similarly designed, fluidized bed reactor operating in series with the first reactor. The second reactor was operated with various partial pressures of 8–13 psi (55–90 kPa) propylene and 12–15 psi (83–103 kPa) ethylene, and 70° C. polymerization temperature to produce a variety of copolymers. Hydrogen level of the second reactor was adjusted to provide a product having a final melt flow of approximately 8. No additional catalyst or SCA mixture is added to the second reactor. The results are illustrated in FIG. 2 where polymer of higher ethylene content (Ec) was obtained using mixtures of DCPDMS and TEOS (invention) compared to use of DCPCMS only (comparative), thereby indicating participation of TEOS in the second reactor despite the presence of dominating SCA, DCPDMS. Examples 23–30 Other SCA mixtures The polymerization conditions of Examples 1–18 were substantially repeated using the following combinations of procatalysts and selectivity control agents:

Table 7–8 Procatalyst A, DCPDMS/1-ethoxy-2-n-pentoxybenzene (EOPOB);

Table 9–10 Procatalyst B, DCPDMS/2,6-lutidine;

Table 11 Procatalyst A, DCPDMS/n-propyltrimethoxysilane (NPTMS)/TEOS.

When operating according to the invention, polymer properties (MF or XS) were affected by all of the selectivity control agents without apparent domination by one SCA in any of the mixtures. Results are contained in Tables 7–11.

TABLE 7

Polymerization Results Using Mixture of SCAs DCPDMS/EOPOB ($\Sigma$(SCA)/Ti = 2)

| Ex. | DCPDMS (percent) | EOPOB (percent) | PP (kg/g cat.) | MF (dg/min) | XS (percent) |
|---|---|---|---|---|---|
| 7A* | 0 | 100 | 22.1 | 46.2 | 6.8 |
| 22 | 8 | 92 | 19.1 | 33.1 | 6.1 |
| 23 | 25 | 75 | 30.1 | 14.4 | 5.4 |
| 24 | 50 | 50 | 28.9 | 6.2 | 4.6 |
| 7B* | 75 | 25 | 30.7 | 6.0 | 3.2 |
| 7C* | 100 | 0 | 34.5 | 2.6 | 2.7 |

*comparative, not an example of the invention

TABLE 8

Comparative Using Mixture of SCAs DCPDMS/EOPOB ($\Sigma$(SCA)/Ti = 50)

| Ex. | DCPDMS (percent) | EOPOB (percent) | PP (kg/g cat.) | MF (dg/min) | XS (percent) |
|---|---|---|---|---|---|
| 8A* | 0 | 100 | 20.6 | 42.3 | 5.3 |
| 8B* | 8 | 92 | 17.2 | 15.3 | 4.9 |
| 8C* | 34 | 66 | 21.3 | 2.6 | 1.9 |
| 8D* | 50 | 50 | 26.4 | 3.4 | 1.7 |
| 8E* | 66 | 34 | 20.6 | 3.6 | 2.4 |
| 8F* | 92 | 8 | 28.0 | 2.6 | 2.0 |
| 8G* | 100 | 0 | 25.1 | 2.2 | 1.9 |

*comparative, not an example of the invention

TABLE 9

Polymerization Results Using DCPDMS/2,6-lutidine ($\Sigma$(SCA)/Ti = 2)

| Ex. | DCPDMS (percent) | 2,6-lutidine (percent) | PP (kg/g cat.) | MF (dg/min) | XS (percent) |
|---|---|---|---|---|---|
| 9A* | 0 | 100 | 17.4 | 22.0 | 54.6 |
| 24 | 25 | 75 | 14.2 | 13.3 | 30.6 |
| 25 | 50 | 50 | 20.1 | 15.2 | 36.9 |
| 9B* | 75 | 25 | 15.5 | 2.2 | 50.8 |
| 9C* | 100 | 0 | 25.3 | 4.2 | 2.0 |

*comparative, not an example of the invention

TABLE 10

Comparative Results Using DCPDMS/2,6-lutidine ($\Sigma$(SCA)/Ti = 50)

| Ex. | DCPDMS (percent) | 2,6-lutidine (percent) | PP (kg/g cat.) | MF (dg/min) | XS (percent) |
|---|---|---|---|---|---|
| 10A* | 0 | 100 | 18.4 | 18.3 | 17.9 |
| 10B* | 50 | 50 | 14.5 | 3.0 | 5.4 |
| 10C* | 100 | 0 | 20.6 | 2.8 | 0.8 |

*comparative, not an example of the invention

TABLE 11

Polymerization Results Using Three SCAs DCPDMS/NPTMS/TEOS

| Ex. | Mole ratio DCPDMS/Ti | Mole ratio NPTMS/Ti | Mole ratio TEOS/Ti | PP (kg/g cat.) | MF (dg/min) | XS (percent) |
|---|---|---|---|---|---|---|
| 11A* | 1.3 | 0 | 0 | 14.2 | 2.7 | 1.0 |
| 11B* | 0 | 1.3 | 0 | 20.1 | 17.2 | 4.8 |

TABLE 11-continued

Polymerization Results Using Three SCAs
DCPDMS/NPTMS/TEOS

| Ex. | Mole ratio DCPDMS/ Ti | Mole ratio NPTMS/ Ti | Mole ratio TEOS/Ti | PP (kg/g cat.) | MF (dg/min) | XS (percent) |
|---|---|---|---|---|---|---|
| 11C* | 0 | 0 | 3.9 | 18.4 | 133.4 | 4.8 |
| 26 | 1.3 | 1.3 | 0 | 18.7 | 7.6 | 2.2 |
| 27 | 1.3 | 0 | 3.9 | 19.3 | 21.7 | 2.1 |
| 28 | 0 | 1.3 | 3.9 | 19.0 | 56.8 | 3.4 |
| 29 | 1.3 | 1.3 | 3.9 | 17.6 | 11.8 | 2.1 |

*comparative, not an example of the invention

The invention claimed is:

1. A catalyst composition for the polymerization of olefins comprising the combination of one or more Ziegler-Natta catalysts comprising one or more transition metal compounds; one or more aluminum containing cocatalysts; and a mixture of two or more different selectivity control agents (SCA's) in a molar ratio based on total transition metal of from 0.5 to 15, including in said mixture of selectivity control agents at least one normally dominating selectivity control agent (SCA1) selected from the group consisting of dicyclopentyldimethoxysilane, di-tert-butyl-dimethoxy-silane, diphenyldimethoxysilane, diisopropyldimethoxysilane, di-n-propyldimethoxysilane, di-n-butyldimethoxysilane, cyclopentyltrimethoxysilane, ethyltriethoxysilane, cyclopentyl-pyrrolidinodimethoxysilane, bis(pyrrolidino) dimethoxysilane, and bis(perhydroisoquinolino)-dimethoxysilane in an amount from 0.1 to 60 mol percent of said mixture and at least one normally dominated selectivity control agent (SCA2), characterized in that the individual selectivity control agents are present in the mixture in relative amounts with respect to each other and with respect to the one or more transition metal compounds, such that the effect of the selectivity control agents on the resulting polymer properties is not determined solely or substantially solely by the normally dominating selectivity control agent.

2. A catalyst composition according to claim 1 wherein the total quantity of selectivity control agent employed is limited to provide a molar ratio, based on transition metal, from 1 to 12.

3. A catalyst composition according to claim 1 wherein the quantity of normally dominating selectivity control agent in the mixture of selectivity control agents is from 1 to 40 mol percent.

4. A catalyst composition according to claim 1 in which only 2 selectivity control agents are present.

5. A catalyst composition according to claim 4 wherein
the normally dominated selectivity control agent is selected from the group consisting of, tetraethoxysilane, tetrapropoxysilane, tetrabutoxysilane, 1,2-di-n-propoxybenzene, 1,2-di-n-butoxybenzene, 1-ethoxy-2-n-pentoxybenzene, 2,6-lutidine, tetrahydrofuran, ethyl p-ethoxybenzoate, and diisobutyl phthalate.

6. A catalyst composition according to claim 1 wherein the selectivity control agent is a mixture of dicyclopentyldimethoxysilane and tetraethoxysilane;
dicyclopentyldimethoxysilane and 1-ethoxy-2-n-pentoxybenzene;
dicyclopentyldimethoxysilane and 2,6-lutidine; or dicyclopentyldimethoxysilane, n-propyltrimethoxysilane and tetraethoxysilane.

7. A catalyst composition according to claim 6 wherein the selectivity control agent comprises a mixture of dicyclopentyldimethoxysilane and tetraethoxysilane.

8. A catalyst composition according to claim 1 wherein SCA1 is selected from the group consisting of dicyclopentyldimethoxysilane, cyclopentylpyrrolidino-dimethoxysilane, bis(pyrrolidino)dimethoxysilane, and bis(perhydroisoquinolino)dimethoxysilane.

9. A catalyst composition according to claim 1 wherein SCA1 is dicyclopentyldimethoxysilane.

10. A polymerization process for the polymerization of one or more olefin monomers wherein the one or more olefin monomers is contacted under polymerization conditions with a polymerization catalyst composition according to any one of claims 1–4 and 5–7.

11. A process according to claim 10 which is a gas phase polymerization process.

12. A process according to claim 11 which is conducted in more than one reactor operating in series.

13. The process of claim 12 wherein the mixture of SCA's is added to only the first reactor of the series.

14. The process of claim 13 in which two reactors are used.

15. The process of claim 10 wherein two olefins are contacted to prepare a copolymer.

16. The process of claim 15 wherein ethylene and propylene are polymerized to form a copolymer.

17. The process of claim 14 wherein polypropylene is prepared in the first reactor and a copolymer of ethylene and propylene is prepared in the second reactor in the presence of the polypropylene prepared in the first reactor.

18. The process according to claim 10 wherein the mixture of SCA's and catalyst composition are contacted in the absence of monomer prior to addition to the reactor.

19. The process according to claim 10 wherein a portion of the olefin monomer is precontacted with the catalyst composition and optionally some or all of the SCA mixture or individual components of the SCA mixture and prepolymerized under prepolymerization conditions and subsequently the resulting prepolymerization product is further contacted with an additional quantity or all of the remaining olefin or olefin mixture and SCA mixture and polymerized.

20. A process according to claim 10 wherein SCA1 is selected from the group consisting of dicyclopentyldimethoxysilane, cyclopentylpyrrolidinodimethoxysilane, bis(pyrrolidino)dimethoxysilane, and bis(perhydroisoquinolino)dimethoxysilane.

21. A process according to claim 20 wherein SCA1 is dicyclopentyldimethoxysilane.

* * * * *